United States Patent [19]
Fink

[11] Patent Number: 5,645,308
[45] Date of Patent: Jul. 8, 1997

[54] SLIDING VISOR

[75] Inventor: Lisa A. Fink, Holland, Mich.

[73] Assignee: Prince Corporation, Holland, Mich.

[21] Appl. No.: 521,041

[22] Filed: Aug. 29, 1995

[51] Int. Cl.$^6$ ........................................ B60J 3/02
[52] U.S. Cl. .................. 296/97.9; 296/97.11; 16/334
[58] Field of Search .............. 296/97.9, 97.11–97.13; 16/333, 334

[56] References Cited

U.S. PATENT DOCUMENTS

| | | |
|---|---|---|
| 2,095,715 | 10/1937 | Rhein . |
| 2,201,348 | 5/1940 | Roberts . |
| 2,201,377 | 5/1940 | Schoenheit . |
| 2,201,378 | 5/1940 | Schoenheit . |
| 2,221,182 | 11/1940 | Davies . |
| 2,264,603 | 12/1941 | Westrope . |
| 2,294,317 | 8/1942 | Pelcher et al. ............... 296/97.11 |
| 2,458,707 | 1/1949 | Jacobs ........................ 296/97.11 |
| 2,566,523 | 9/1951 | Holland et al. . |
| 3,556,585 | 1/1971 | Binder . |
| 3,741,616 | 6/1973 | Mahler et al. . |
| 4,582,356 | 4/1986 | Kaiser et al. . |
| 4,734,955 | 4/1988 | Connor ........................ 16/332 |
| 4,858,983 | 8/1989 | White et al. ................. 296/97.13 |
| 4,902,063 | 2/1990 | Crink .......................... 296/97.11 |
| 4,921,300 | 5/1990 | Lawassani et al. .......... 296/97.11 |
| 4,925,233 | 5/1990 | Clark .......................... 296/97.11 |
| 4,941,704 | 7/1990 | Baumert et al. . |
| 4,998,765 | 3/1991 | Van Order et al. .......... 296/97.11 |
| 5,004,289 | 4/1991 | Lanser et al. ............... 296/97.12 |
| 5,007,532 | 4/1991 | Binish et al. ................ 296/97.1 |
| 5,026,108 | 6/1991 | Leahy ......................... 296/97.11 |
| 5,255,965 | 10/1993 | Chen et al. .................. 16/334 X |
| 5,331,518 | 7/1994 | Roark et al. ................. 362/61 |
| 5,409,285 | 4/1995 | Snyder et al. ............... 296/97.11 |
| 5,454,617 | 10/1995 | Welter ........................ 296/97.12 X |

FOREIGN PATENT DOCUMENTS

| | | | |
|---|---|---|---|
| 180700A | 5/1986 | European Pat. Off. . | |
| 231440A | 8/1987 | European Pat. Off. ....... | 296/97.11 |
| 2470703 | 6/1981 | France ........................ | 296/97.9 |
| 2491403 | 4/1982 | France ........................ | 296/97.12 |
| 2697479 | 5/1994 | France ........................ | 296/97.9 |
| 2442333 | 3/1975 | Germany ..................... | 296/97.12 |
| 2448280 | 4/1976 | Germany ..................... | 296/97.13 |
| 3235997 | 3/1984 | Germany ..................... | 296/97.11 |
| 5286363 | 11/1993 | Japan . | |
| 1395689 | 5/1975 | United Kingdom . | |
| 1422368 | 1/1976 | United Kingdom . | |
| 2088299 | 6/1982 | United Kingdom . | |

Primary Examiner—Dennis H. Pedder
Attorney, Agent, or Firm—Price, Heneveld, Cooper, DeWitt & Litton

[57] ABSTRACT

A visor rod assembly includes a polymeric torque device having an elongated bore which includes at least one detent formed on the inner radius thereof and which receives an elongated visor pivot rod having a noncircular cross section. A visor with such an assembly can slide along the pivot rod to a variety of selected use positions.

18 Claims, 2 Drawing Sheets

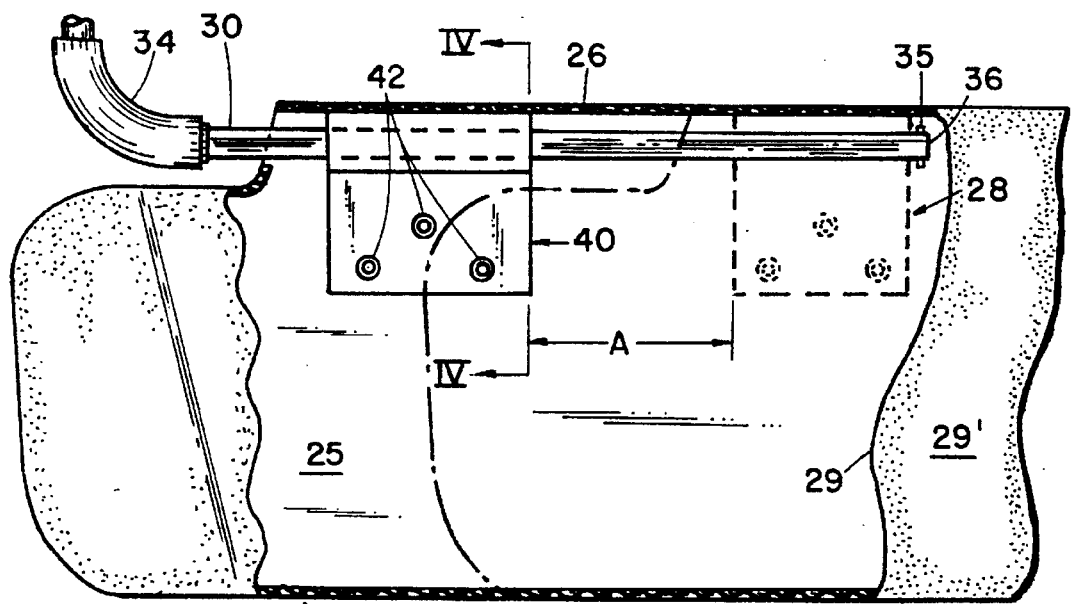
FIG 3
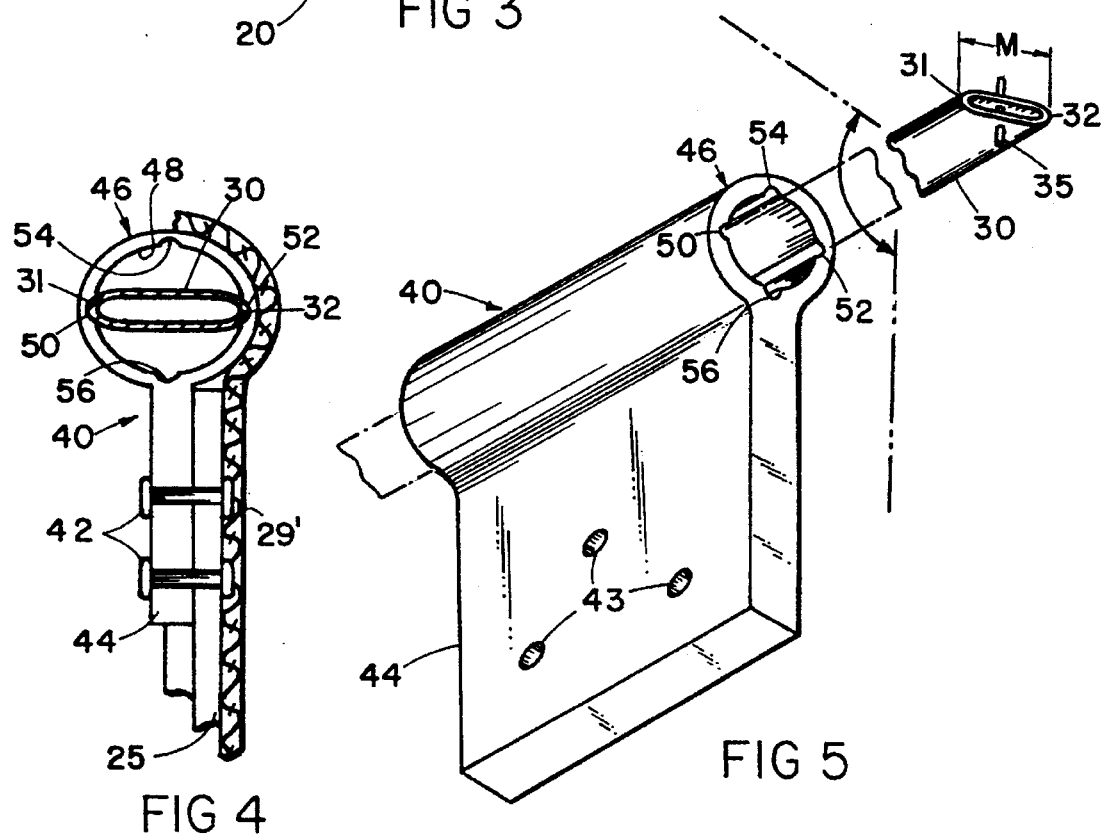
FIG 4
FIG 5

SLIDING VISOR

BACKGROUND OF THE INVENTION

The present invention relates to visors for vehicles and particularly to a visor which can slide along an elongated pivot rod.

Conventional visors typically include a visor panel mounted to a pivot rod assembly to allow the visor to move from a raised, stored position above the vehicle windshield adjacent the headliner for storage to a lowered, use position behind the windshield. The pivot rod assembly typically also allows the visor to move to a side window position to block incident sunlight from the side. Several such visor systems also employ a mechanism to allow the visor to slide along an elongated pivot rod, such that when the visor is in a lowered, use position, the visor can be slid along the pivot rod to allow adjustment of the visor to block incident light. U.S. Pat. Nos. 4,925,233; 4,998,765; and 5,409,285 are representative of such sliding visor assemblies.

In order to hold a visor in a raised, stored position and control its position in selected lowered, use positions, conventional visor assemblies typically utilize an internal torque device which is an interface between the visor body and the visor pivot rod to provide not only a snap-up locking position for the visor against the vehicle headliner when stored but also a predetermined rotational holding and moving torque when lowered from a stored position to selected use positions. This device is also important when the visor assembly includes an illuminated vanity mirror since the mirror alignment can be selected by the user for maximum efficiency in use. There exists a variety of torque devices which are typically made of spring steel which interengage flats on the visor rod, such as disclosed in U.S. Pat. No. 5,004,289. Also, some torque devices use a deformable polymeric member which may include internally formed detents for a noncircular visor rod. U.S. Pat. Nos. 4,734,955 and 4,352,518; British Patent Nos. 1395689 and 1422368, and French Patent No. 2491403 disclose polymeric torque devices which can provide such function.

Although the advantages of a polymeric torque device include the fact that they do not require separate lubrication as is the case with many spring steel torque devices as is commonly known, frequently such torque devices do not provide acceptable long-term service. This is due to the "creeping" of the polymeric material and the resultant loosened interrelationship between the visor rod and the torque device with age. None of the known sliding visor assemblies have employed a polymeric torque device. While sliding visors have proven very effective in their use, they typically have required somewhat complicated mechanism to allow the smooth sliding action and yet one which holds the visor in a selected adjusted position along the length of the visor rod.

SUMMARY OF THE PRESENT INVENTION

The visor system of the present invention combines the desired properties of a polymeric torque device for a visor rod assembly with the adjustability of a sliding visor by providing a visor body having fixedly secured therein a polymeric torque device having an elongated bore which includes at least one detent formed on the inner radius thereof and which receives an elongated visor pivot rod having a noncircular cross section. When the visor is in a raised position, the visor rod engages the detent for holding the visor in a stored position against the vehicle headliner. When in a lowered, use position, the visor rod again aligns with the same or another detent and allows the visor to slide along the pivot rod in a controlled fashion to optimally position the visor for use in blocking incident light.

The resultant visor system provides a relatively inexpensive sliding visor in which an integrally molded polymeric torque device is anchored to the visor body and receives an elongated around pivot rod for completing the assembly. This construction provides a smoothly operable, relatively inexpensive visor assembly which provides the desired characteristics for a sliding visor without the need for the somewhat expensive mechanism used in the sliding visor assemblies of the prior art or additional lubrication that is conventionally employed with spring steel type torque devices. These an other features, objects and advantages of the present invention will Best be understood by reference to the following description thereof together with reference to the accompanying drawings.

BRIEF DESCRIPTION OF THE DRAWINGS

FIG. 3 is an enlarged, fragmentary, front elevational view of the visor assembly of FIGS. 1 and 2 shown partially broken away and partly in phantom form;

FIG. 4 is a cross-sectional view of the visor assembly shown in FIG. 3 taken along section line IV—IV of FIG. 3; and FIG. 5 is an enlarged, fragmentary, perspective view of the visor rod and torque device.

DETAILED DESCRIPTION OF THE PREFERRED EMBODIMENT

Figure 1:
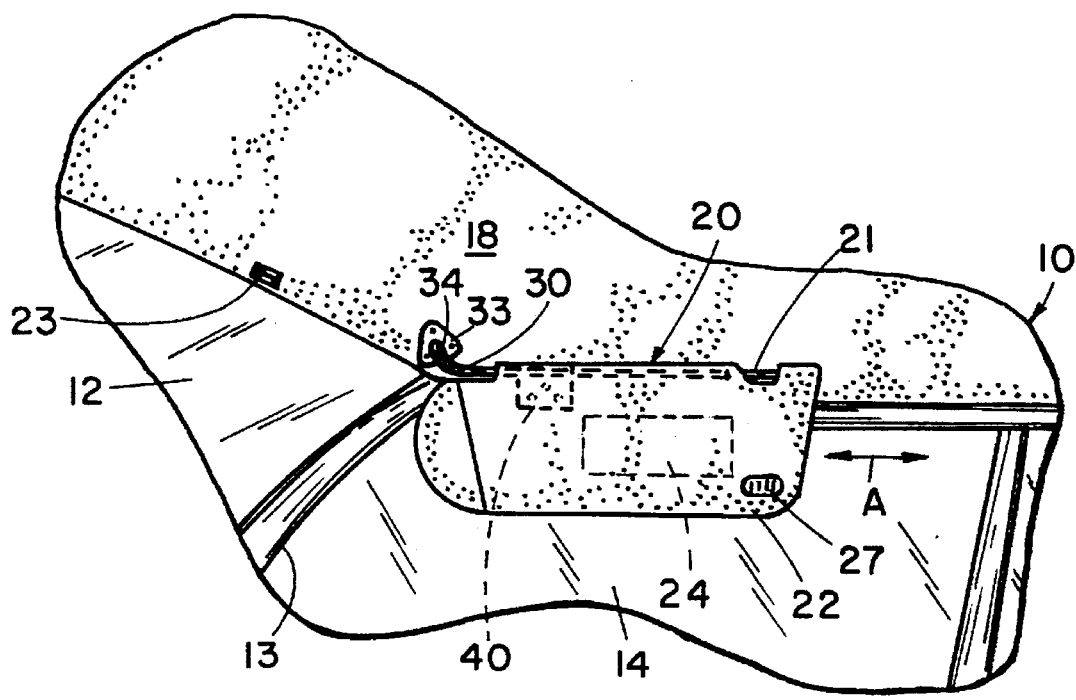
FIG. 1 is a perspective view of a vehicle including the visor assembly of the present invention, showing the visor in a lowered, use position along the side window.
Figure 2:
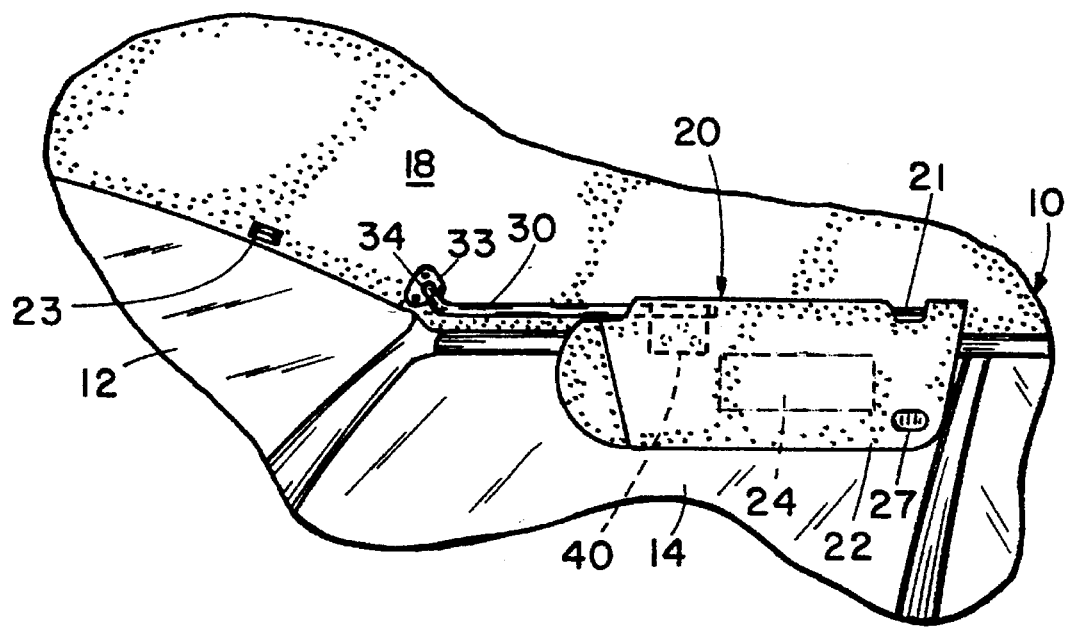
FIG. 2 is a fragmentary, perspective view of the visor system shown in FIG. 1 with the visor moved along the pivot rod to a different selected adjusted position.

Referring initially to FIGS. 1 and 2, there is shown a vehicle 10 which includes a visor assembly 20 embodying the present invention. Visor assembly 20 is mounted to the roof of a vehicle by means of a pivot rod 30 which extends within the body of the visor and has an end 33 which is mounted to the vehicle sheet metal roof by means of an elbow bracket assembly 34 to allow the visor to move from a front window to a side window position. The vehicle includes a windshield 12 and side window 14 separated by an A-pillar 13 with the body 22 of the visor 20 providing blocking for incident sunlight along the side window 14 when adjustably slid along pivot rod 30 as illustrated in FIGS. 1 and 2. The elbow bracket assembly 34 can be conventional or a twist-in type as disclosed in U.S. Pat. No. 5,242,204. In order to support the visor in the front windshield position, an auxiliary visor receiving clip 23 may be mounted to the roof above the windshield 12 and the visor body 22 may include an auxiliary mounting rod 21 which releasably snap-fits within clip 23. The visor body 22 includes an illuminated vanity mirror assembly 24, which can be of the type disclosed, for example, in U.S. Pat. No. 5,331,518, and a programmable garage door opening transmitter 27 of the type disclosed in U.S. Pat. No. 5,442,340.

The visor assembly 20 also includes a torque device 40 which cooperates with the visor rod 30 to provide the controlled raising and lowering of the visor between a raised, stored position against tile vehicle headliner 18 to a lowered, use position along the front windshield or the side window and the adjustable sliding movement of the visor body as illustrated in FIGS. 1 and 2. The visor rod and torque member are disclosed in greater detail now with reference to FIGS. 3–5.

The visor 20 comprises a visor body 22 which may be made of a molded polymeric material or can be of a fiberboard, generally butterfly construction with front and rear panels 25 and 29 joined along an upper edge 26 and defining a channel 28 for receiving the pivot rod 30 and torque fitting 40 therein. The visor core construction, including panels 25 and 29 hinged along top edge 26, can be of the type disclosed in U.S. Pat. No. 5,007,532, the disclosure of which is incorporated herein by reference. The visor body panels 25 and 29 are covered by suitable upholstery fabric 29' (FIGS. 3 and 4) to provide a decorative appearance to the visor conforming it to that of the vehicle interior. As best seen in FIG. 4, the torque fitting 40 is secured to the rear panel 25 of the visor body 22 by means of rivets 42 which extend through apertures 43 in the flange 44 of the torque device 40. The torque device comprises a cylindrical end 46 integrally joined to flange 44 with the cylindrical end 46 including a generally circular bore 48 having an internal diameter slightly less than tile major dimension "M" (FIG. 5) of the around or elliptical-shaped visor rod 30 such that the visor rod will deform the cylindrical section 46 of the polymeric torque device 40 when rotated from a nondetented position. The internal bore 48 of the cylindrical section 46 includes a first pair of internal detents 50 and 52 which, as best seen in FIGS. 4 and 5, align with the tips 31 and 32 of pivot rod 30 when the visor is in a lowered, use position as seen in the Figs. In this position, the visor is in a stable lowered, use position and the lubricous frictional interengagement between the polymeric torque fitting 40 and visor rod 30 allow the sliding of the visor and torque fitting affixed thereto along the pivot rod as shown in FIGS. 1–3 in the direction indicated by arrow "A".

The internal bore 48 of the torque fitting may also include a second set of detents 54 and 56 offset from the opposed detents 50 and 52 approximately 110-degrees and in opposed relationship to one another such that the visor can be moved to a raised, stored position and detented in such position for holding the visor adjacent the vehicle roof. The offsetting of detents 54, 56 from opposed detents 50, 52 will be at an angle selected for a given vehicle to properly align the visor adjacent the vehicle headliner 18 when in a stored position and, therefore, may vary from vehicle to vehicle.

In a preferred embodiment of the invention, the visor pivot rod 30 was made of steel suitably treated for the automotive environment and having a major axis with a dimension "M" of approximately ⸱ inch and a minor axis orthogonal to the major axis and having a dimension of approximately 3/16 inch. The torque fitting 40 is integrally molded of a suitable lubricous polymeric material which provides resiliency for the generally circular bore 48 through end 46 of the fitting. One suitable material was CELCON® and was formed with an internal bore diameter of 1/32 of an inch less than the major dimension "M" of tile visor pivot rod 30 to hold the visor in a selected lowered position. The bore detents 50, 52, 54 and 56 are generally semicylindrical and extend longitudinally along the length of bore 48 with a depth of about 1/32 of an inch such that when the ends 31 and 32 of visor rod 30 are aligned with the detents, this visor can slide along the rod. A stop pin 35 extends through the end 36 of visor rod 30 remote from bracket assembly 34. When the visor, however, is rotated from either of the detented positions, the generally circular bore 48 of the torque fitting distorts and securely holds the visor in a desired lowered, use position. Thus, for example, if the visor is lowered to the front windshield position, it can be slid along the visor rod when in its detented position, shown in FIG. 4, and, if it is desired to tilt the visor toward or away from the windshield, the visor is then moved from the detented lowered position to a desired use position once adjusted along the length of the visor rod. The deformation of the torque fitting when in the nondetented position provides a sufficient frictional force so that sliding of the visor cannot be achieved. This feature provides for the relatively easy sliding movement of the visor and its subsequent tilt adjustment to a locked adjusted position along the visor rod. It also accommodates for characteristics of the polymeric torque fitting device which, if precisely formed, may creep with age and, therefore, provide undesirable slack between the visor rod and torque fitting. Although each of the detents 50, 52, 54 and 56 are generally semicylindrical along the length of bore 48, they may take on other forms and the radius of curvature such semicylindrical bores may be slightly different than the ends 31, 32 of visor rod 30 to provide a pair of contact points as opposed to a continuous contacting surface which pair of contact points will also allow for some change in the dimensions of the polymeric torque device with age. The contact points may, upon use, gradually increase in arcuate contact area and yet continuously provide the sliding and some holding action between the pivot rod and torque device. In the preferred embodiment, the wall thickness of the cylindrical end 46 of the torque device was about 3/32 inches to allow for the deformation of the cylindrical end when the visor is raised or lowered from a detented position. In a preferred embodiment of the invention, the radius of curvature of detents 50, 52, 54 and 56 was approximately 1/16 of an inch, and the radius of curvature of ends 31 and 32 of the around pivot rod 30 was approximately 1/8 inch.

As can be appreciated, the visor rod 30 could be of a circular cross section having a diameter less than that of bore 48 of the torque device and include longitudinally extending projections aligning with the 180-degree offset detents of the bore of torque device 40 if desired. However, utilizing standard stock circular rod and deforming the rod into either an around shape, as shown in the preferred embodiment, or other noncircular cross section is less expensive and provides the desired interaction between the pivot rod and torque device.

Thus, with the system of the present invention, an improved sliding visor assembly is provided utilizing a polymeric torque device which is relatively inexpensive and provides a desired feel and longevity to the operation of the visor assembly so formed. It will become apparent to those skilled in the art that various modifications to the preferred embodiment of the invention as described herein can be made without departing from the spirit or scope of the invention as defined by the appended claims.

The embodiments of tile invention in which an exclusive property or privilege is claimed are defined as follows:

1. A visor assembly comprising:

a visor body;

a polymeric torque device fixedly secured to said visor body, said polymeric torque device having a deformable generally cylindrical bore with at least one detent formed therein and extending longitudinally within said generally cylindrical bore; and a visor rod extending within said cylindrical bore of said torque fitting and having an end extending from said visor body for attachment to vehicle, wherein said visor rod has an obround tubular cross section for selectively frictionally engaging said cylindrical bore of said torque fitting as said visor body is rotated with respect to said visor rod.

2. The visor assembly as defined in claim 1 wherein said torque fitting includes at least a pair of opposed longitudinally extending detents.

3. The visor assembly as defined in claim 2 wherein said longitudinally extending detents of said torque fitting are generally semicylindrical.

4. The visor assembly as defined in claim 3 wherein said detents have a radius of curvature and said visor rof has a radius of curvature and said radius of curvature of said detents is less than the radius of curvature of said visor rod.

5. The visor assembly as defined in claim 1 and further including an illuminated vanity mirror assembly.

6. The visor assembly as defined in claim 1 and further including a programmable garage door opening transmitter.

7. A visor control assembly for insertion into a visor body for allowing said visor body to slide between various selected positions when in a lowered, use position, said assembly comprising:

a visor pivot rod for insertion into a visor body, said visor pivot rod having a length sufficient to allow the visor body to move to selected positions along said visor pivot rod, said visor pivot rod including a section with a non-round tubular cross section, said visor pivot rod section having a major and a minor diameter with said major diameter about twice that of said minor diameter; and a visor torque control made of a lubricous polymeric material and comprising a flange and integral, deformable, generally cylindrical bore for receiving said section of said visor rod, said bore having an internal diameter slightly less than said major diameter of said visor rod to provide a frictional torque when said rod is inserted within said bore to deform the bore and wherein said generally cylindrical bore includes at least one detent extending therealong for allowing said visor rod section to engage said detent and slide along said visor rod when in a detented position to selected use positions.

8. The assembly as defined in claim 7 wherein said visor rod has an around cross section.

9. The assembly as defined in claim 8 wherein said torque fitting includes at least a pair of opposed longitudinally extending detents.

10. The assembly as defined in claim 9 wherein said longitudinall extending detents of said torque fitting are generally semicylindrical.

11. The assembly as defined in claim 10 wherein said detents have a radius of curvature and said visor pivot rod has a radius of curvature and said radius of curvature of said detents is less than the radius of curvature of said visor pivot rod.

12. A visor assembly comprising:

a visor body;

a polymeric torque device fixedly secured to said visor body, said polymeric torque device having a generally cylindrical bore with a plurality of longitudinally extending detents formed therein; and a visor rod extending within said cylindrical bore of said torque fitting and having an end extending from said visor body for attachment to a vehicle, wherein said visor rod includes a generally oval cross section with a major diameter about twice that of the minor diameter for selectively frictionally engaging said cylindrical bore of said torque fitting as said visor body is rotated with respect to said visor rod such that said visor rod seats in said detents to allow said visor body to slide along said rod when seated in said detents.

13. The visor assembly as defined in claim 12 wherein said visor rod has an obround cross section.

14. The visor assembly as defined in claim 13 wherein said longitudinally extending detents of said torque fitting are generally semicylindrical.

15. The visor assembly as defined in claim 14 wherein said detents have a radius of curvature and said visor rod has a radius of curvature and said radius of curvature of said detents is less than the radius of curvature of said visor rod.

16. The visor assembly as defined in claim 12 and further including an illuminated vanity mirror assembly.

17. The visor assembly as defined in claim 12 and further including a programmable garage door opening transmitter.

18. The visor assembly as defined in claim 12 wherein said bore is deformable and deforms in response to the relative rotation of said torque device with respect to said rod.

* * * * *

UNITED STATES PATENT AND TRADEMARK OFFICE
CERTIFICATE OF CORRECTION

PATENT NO. : 5,645,308
DATED : July 8, 1997
INVENTOR(S) : Lisa A. Fink

It is certified that error appears in the above-indentified patent and that said Letters Patent is hereby corrected as shown below:

```
Column 2, line 15, "Best" should be --best--.
Column 2, line 65, "tile" should be --the--.
Column 3, line 22, "tile" should be --the--.
Column 3, line 23, "around" should be --obround--.
Column 3, line 56, "tile" should be --the--.
Column 4, line 41, "around" should be --obround--.
Column 4, line 54, "tile should be --the--.
Column 3, line 33, "around" should be --obround--.
Column 4, line66, After "to" insert --a--.
Column 5, line11, "rof" should be --rod--.
Column 5, line 43, "around" should be --obround--.
```

Signed and Sealed this

Twenty-third Day of September, 1997

Attest:

Attesting Officer

BRUCE LEHMAN

Commissioner of Patents and Trademarks